(12) United States Patent
Higashide

(10) Patent No.: US 8,537,776 B2
(45) Date of Patent: Sep. 17, 2013

(54) WIRELESS DEVICE

(75) Inventor: Naoto Higashide, Yokohama (JP)

(73) Assignee: Kyocera Corporation, Kyoto (JP)

( * ) Notice: Subject to any disclaimer, the term of this patent is extended or adjusted under 35 U.S.C. 154(b) by 1019 days.

(21) Appl. No.: 12/413,386

(22) Filed: Mar. 27, 2009

(65) Prior Publication Data

US 2009/0247167 A1  Oct. 1, 2009

(30) Foreign Application Priority Data

Mar. 28, 2008 (JP) .................. 2008-087187

(51) Int. Cl.
*H04W 4/00* (2009.01)

(52) U.S. Cl.
USPC .......................... 370/331; 455/436

(58) Field of Classification Search
USPC ............. 370/328–329, 331–333, 335–336, 370/338, 342–343, 345; 455/436–444
See application file for complete search history.

(56) References Cited

U.S. PATENT DOCUMENTS

| | | | | |
|---|---|---|---|---|
| 5,590,133 | A * | 12/1996 | Billstrom et al. | 370/349 |
| 6,483,826 | B1 * | 11/2002 | åkerberg | 370/335 |
| 6,526,030 | B2 * | 2/2003 | Rezaiifar et al. | 370/335 |
| 6,628,933 | B1 * | 9/2003 | Humes | 455/404.1 |
| 7,526,289 | B2 * | 4/2009 | Schwarz et al. | 455/439 |
| RE42,374 | E * | 5/2011 | Hasegawa | 455/512 |
| 8,155,098 | B2 * | 4/2012 | Huang et al. | 370/343 |
| 2003/0067906 | A1 * | 4/2003 | Young | 370/347 |
| 2003/0223394 | A1 * | 12/2003 | Parantainen et al. | 370/336 |
| 2004/0248596 | A1 * | 12/2004 | Panchal | 455/466 |
| 2005/0232247 | A1 * | 10/2005 | Whitley et al. | 370/352 |
| 2006/0089161 | A1 * | 4/2006 | Kim et al. | 455/458 |
| 2008/0096561 | A1 * | 4/2008 | Liu et al. | 455/436 |
| 2009/0265470 | A1 * | 10/2009 | Shen et al. | 709/227 |

FOREIGN PATENT DOCUMENTS

| | | |
|---|---|---|
| JP | 2001168990 | 6/2001 |
| JP | 2004096458 | 3/2004 |
| JP | 2006005412 | 1/2006 |
| JP | 2007148837 | 6/2007 |

* cited by examiner

*Primary Examiner* — Kevin Mew
(74) *Attorney, Agent, or Firm* — Duane Morris LLP

(57) ABSTRACT

A wireless device and technology operable to optimize communications during an emergency is disclosed. The wireless device can detect communication congestion in a base station, and search for alternate base stations that can provide annunciation information during the emergency. If a suitable base station can be found, handoff is made and the annunciation information is acquired.

22 Claims, 6 Drawing Sheets

Without BCSMS reception Setting

With CSMS reception Setting

Normal monitoring timing

BC slot monitoring timing

WIRELESS DEVICE

CROSS-REFERENCE TO RELATED APPLICATION

The present application claims priority under 35 U.S.C. §119 to Japanese Patent Application No. 2008-087187, filed on Mar. 28, 2008. The content of which is incorporated by reference herein in its entirety.

FIELD OF INVENTION

Embodiments of the present disclosure relate generally to a wireless device, and more particularly relates to a wireless device capable of receiving annunciation information.

BACKGROUND OF THE INVENTION

Short Message Service (SMS) is a messaging system for wireless devices and internet systems. Broadcast Short Message Service (BCSMS) or other annunciation short message service is a technology that allows a text or binary message to be distributed to all mobile phones connected to a wireless and/or internet system. Whereas SMS messages are sent point-to-point, BCSMS are sent point-to-multipoint.

A system for annunciating disaster information to a mobile phone is known. There is also known an emergency information distribution system capable of receiving emergency information such as disaster prevention/crime prevention information regarding the vicinity of a current location by using an annunciation short message service such as BCSMS even if such a location is not registered in advance. For instance, if an occurrence of a disaster such as an earthquake is predicted for a predetermined region, the disaster predication is annunciated all at once to the relevant area.

However, if an unpredictable event such as an unpredicted disaster occurs, no reception of annunciation information may occur because of congestion on the communication system due to concentrated movement of users and the like. In such a case, the user cannot effectively utilize the annunciation short message service. Therefore, there is a need for a wireless device enabling the user to effectively utilize annunciation short message type services.

SUMMARY

A wireless device and technology operable to optimize communications during an emergency is disclosed. The wireless device can detect communication congestion in a base station, and search for alternate base stations that can provide annunciation information during the emergency. If a suitable base station can be found, handoff is made and the annunciation information is acquired.

A first embodiment comprises a wireless device. The wireless device comprises a communication module operable to communicate with a plurality of base stations and a control module comprising a hand-off module. The hand-off module is operable to change a standby base station from a first base station in a wait state to a second base station based on a comparison between a first signal intensity from the first base station and a first threshold value. The control module is further operable to change the first threshold value in response to receiving annunciation information from the first base station.

A second embodiment comprises a method for communication in a wireless device. The method comprises communicating with a standby base station, and comparing a first signal intensity from a first base station and a first threshold value to obtain a first comparison result. The method further comprises changing the standby base station from the first base station in a wait state to a second base station based on the first comparison result. The method also comprises receiving annunciation information from the first base station, and changing the first threshold value based on the annunciation information.

A third embodiment comprises a computer readable medium for a wireless device. The computer readable medium comprises program code for communicating with a standby base station, and comparing a first signal intensity from a first base station and a first threshold value to obtain a first comparison result. The computer readable medium further comprises program code for changing the standby base station from the first base station in a wait state to a second base station based on the first comparison result. The computer readable medium also comprises program code for receiving annunciation information from the first base station, and changing the first threshold value based on the annunciation information.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the disclosure. The figures are provided to facilitate understanding of the disclosure without limiting the breadth, scope, scale, or applicability of the disclosure. The drawings are not necessarily made to scale.

DETAILED DESCRIPTION OF EXEMPLARY EMBODIMENTS

The following description is presented to enable a person of ordinary skill in the art to make and use the embodiments of the disclosure. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, embodiments of the present disclosure are not intended to be limited to the examples described herein and shown, but are to be accorded an scope consistent with the claims.

Embodiments of the disclosure are described herein in the context of a practical non-limiting application, namely, announcing unpredictable events by a broadcast short message service (BCSMS) on a mobile device. Embodiments of the disclosure, however, are not limited to such mobile device applications, and the techniques described herein may also be utilized for other of devices and applications. For example, embodiments may be applicable to announcing unpredictable events on a PDA (Personal Digital Assistant), electronic notebook, game machine and the like. Furthermore, embodiments of the disclosure are not limited to the BCSMS and other broadcast services for transmitting the annunciation information such as BCMCS (Broadcast Multi-Cast Service) and CBS (Cell Broadcast) may also be used.

In the following description of exemplary embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the present invention. For the sake of brevity, conventional techniques and components related to mobile phones and other functional aspects of portable electronic devices and the individual operating components of a device may not be described in detail herein.

Figure 1:
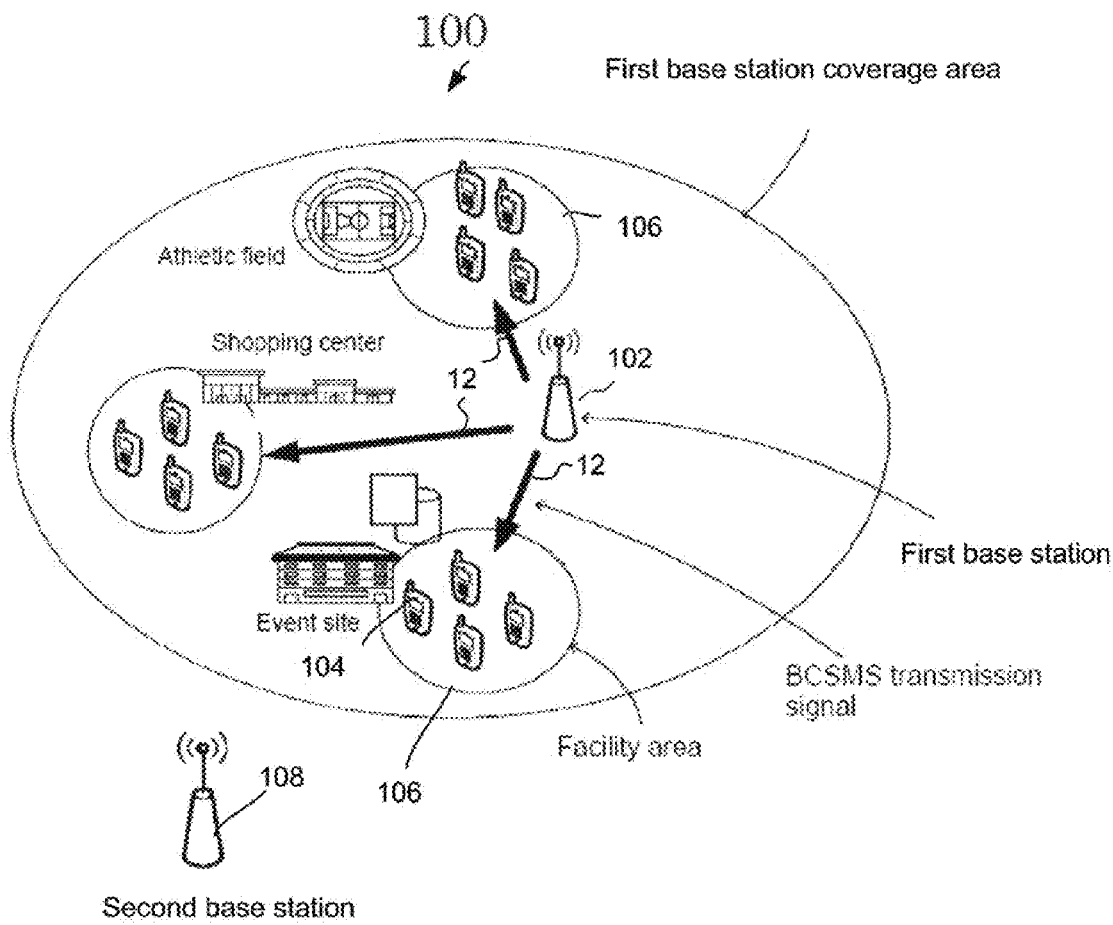
FIG. 1 illustrates a BCSMS communication system to which a wireless device is associated according to an embodiment of the disclosure.

FIG. 1 illustrates a BCSMS communication system 100 to which a wireless device 104 is associated according to an embodiment of the disclosure. The BCSMS communication system 100 comprises a first base station 102, a wireless device 104, a plurality of other wireless devices 106, and a second base station 108.

As shown in FIG. 1, a message is transmitted for the coverage area of first base station 102 in the BCSMS. The range is determined by the communication provider, but its width extends from a few hundred meters to a few kilometers. Thus, the coverage area is large compared to the size of single gathering of people such as a commercial establishment (shopping center), sports facility (athletic field), an event site, and the like. Consequently, a large concentration of mobile devices such as a wireless device 104 may cause congestion on a communication system 100. In FIG. 1, the arrow 12 indicates the transmission signal by the BCSMS. Information may also be distributed to users in another area.

When a message (e.g., an SMS message) of the BCSMS is transmitted from the first base station 102, the wireless device 104 receives annunciation information packaged with a broadcast index (BCAST_INDEX) and thus is able to know in advance that another short message will be annunciated in a future broadcast slot (BC slot). The broadcast index (BCAST_INDEX) is a parameter specifying a timing of the BC slot. The annunciation information message is also packaged with a broadcast address (BC_ADDR). The broadcast address (BC_ADDR) is packaged with a message number (MESSAGE_ID) of the short message, a zone (ZONE_ID), a priority (PRIORITY), a language (LANGUAGE), a service identifier (SERVICE) indicating the type of service category, and the like.

The wireless device 104 stores in storage module 16 a list of receivable base stations such as second base station 108 capable of BCSMS communication. Reception determination of the short message and reception availability at the wireless device 104 may be based on the priority (PRIORITY), the service identifier (SERVICE), and the language (LANGUAGE) of the fields in the broadcast address (BC_ADDR) package.

The short message is transmitted using a predetermined time slot (BC slot) of a paging channel. The BC slot and paging channel are specified by the network (not shown) via the communication system 100. The communication module 11 receives the broadcast information (short message) based on the BC slot (predetermined time slot) or a predetermined packet on the paging channel sent from the base station 102/108.

Figure 2A:
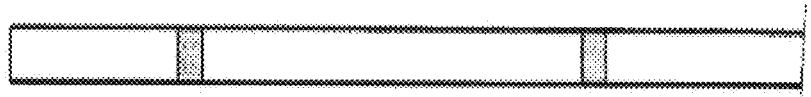
FIGS. 2A-2D illustrate a BC slot monitoring operation in the slot mode of the BCSMS communication system.
Figure 2B:
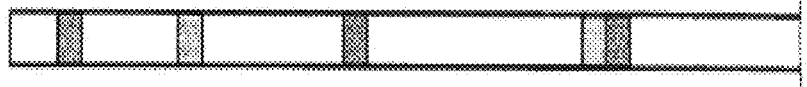
Figure 2C:
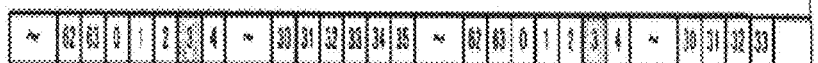
Figure 2D:
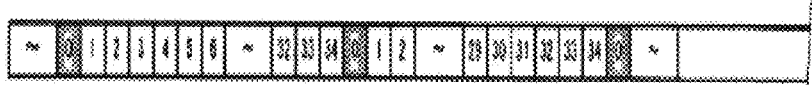

FIGS. 2A-2D illustrate a BC slot monitoring operation in the slot mode of the BCSMS in the communication system 100, and show an example of monitoring the paging channel including monitoring the timing (slot mode) of the BC slot according to an embodiment of the disclosure. FIG. 2A shows the slot mode for when BCSMS reception is not set. FIG. 2B shows the slot mode for when BCSMS reception is set. FIG. 2C shows the normal monitoring of the timing. FIG. 2D shows the BC slot monitoring of the timing.

As shown in FIGS. 2A-2D, the BC slot is determined at a cycle different from the normal monitoring timing (standby slot). The BC slot is monitored by the wireless device 104 capable of receiving at least one broadcast address (BC_ADDR), and the wireless device 104 in which the relevant slot is the normal standby slot.

The wireless device 104 can receive the short message in the BC slot, and perform the reception process when the short message is determined to be receivable from the content of the broadcast address (BC_ADDR). The reception process includes decoding and storing of data, and announcing the reception to the user.

Figure 3:
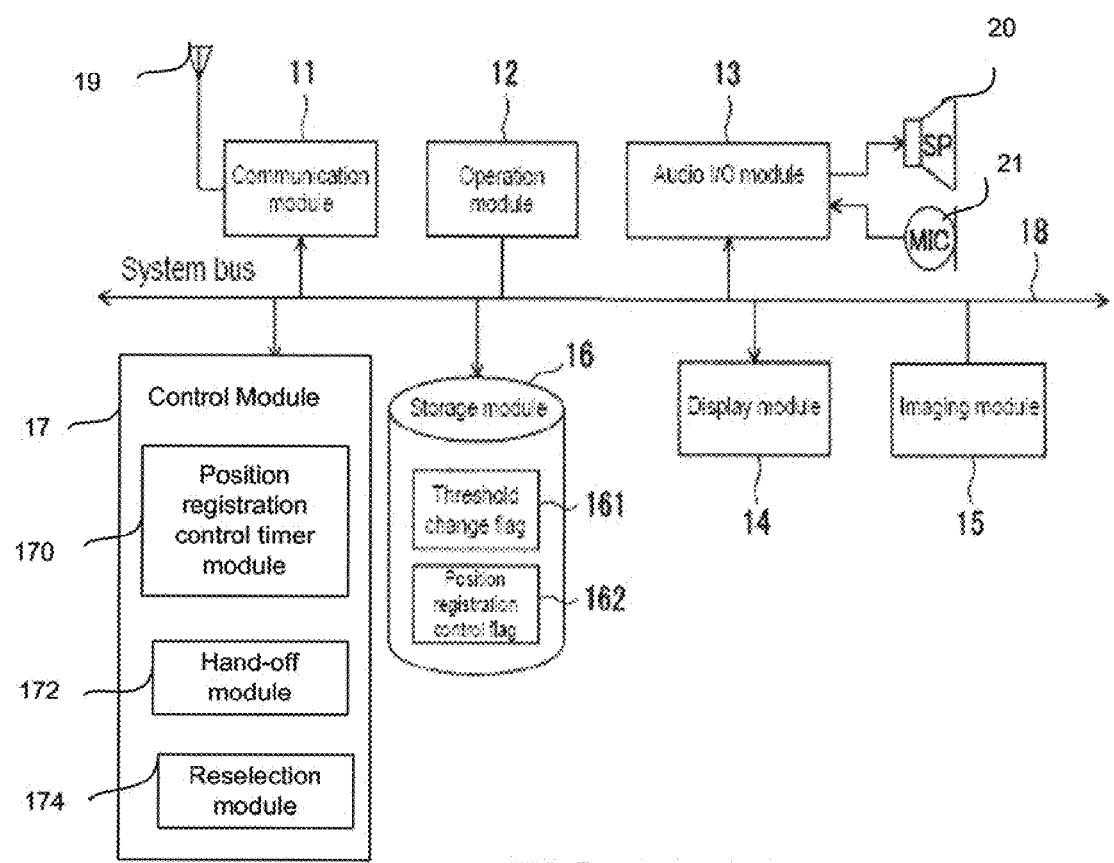
FIG. 3 illustrates an exemplary schematic block diagram showing a signal processing system of a wireless device according to an embodiment of the disclosure.

FIG. 3 illustrates an exemplary schematic block diagram showing a signal processing system 300 of a wireless device 104 according to an embodiment of the disclosure. The system 300 allows the user to receive the emergency information service using the BCSMS, regardless of congestion in the BCSMS communication system 100. The congestion may be caused by the network side including the first base station 102.

The system 300 may comprise: a communication module 11, an operation module 12, an audio input/output 13, a display module 14, an imaging module 15, a storage module 16, and a control module 17. These and other elements of system 300 may be interconnected together using a two-way data communication bus 18, or any suitable interconnection arrangement comprising a plurality of lines for address, data, and control. Such interconnection facilitates communication between the various elements of system 300. Those skilled in the art will understand that the various illustrative blocks, modules, circuits, and processing logic described in connection with the embodiments disclosed herein may be implemented in hardware, computer-readable software, firmware, software on computer-readable media, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present disclosure.

The communication module 11 is operable to wirelessly communicate with one or more base stations (e.g., 102 and 108 in FIG. 1) using one or more communication systems such as communication system 100. The communication module 11 captures a wireless signal from a predetermined base station (102 in FIG. 1) communicatively coupled to a public communication network in a wireless communication system 100. The communication module 11 also performs wireless communication with the first base station 102 (and second base station 108) and performs position registration with respect to the network using a unique terminal ID and the like of the wireless device 104. The wireless device 104 is registered in a position registration zone of the first base station 102 by the network. In this manner, the incoming call control and the like can be performed as necessary. After performing the position registration and transitioning to the standby state, the communication module 11 of the wireless device 104 can transmit and receive various data such as, without limitation, audio data in audio communication, text data in e-mail transmission/reception, web data in web browsing, and the like.

The communication module 11 is operable to transmit and receive a plurality of communication signals via a communication module transceiver (not shown). The communication module 11 is also operable to carry out a radio communication with a network side device via a mobile communication network (not shown). The communication module transceiver communicates with a first or second base station 102/108 transceiver via a wireless data communication link (not shown). The communication module transceiver cooperates with the base station 102/108 transceiver with a suitably configured RF antenna arrangement 19 that can support a particular wireless communication protocol and modulation scheme such as, without limitation, the Wi-Fi and CDMA family of industry standards. For example, three types of communication protocols exist in the wireless communication of CDMA2000_1x standard in Japan. Each type has a different usage frequency band, and a different communication protocol, but is collectively managed in a concentrated manner in terms of position registration on the network side. That is, position registration of the wireless device 104 to the network side is registered in one of the communication systems, and the call-out in time of incoming call, and the like is performed using the registered communication system. Communication with the network side is efficiently performed through reception of the incoming call from the network side or reception of the annunciation information by monitoring the paging channel (sent from the base station 102/108) in the communication system 100 selected by the communication module 11.

The operating module 12 may comprise an input pad with keys for performing various functions which can be activated by the user. For example keys may comprise a power supply key, a phone call key, a numeric key, a letter key, a direction key, a decision key, a call originating key and the like. In response to activation of at least one of the keys (activated key), a signal corresponding to a content of operation is transmitted to the control module 17. The control module 17 receives the signal and determines the corresponding instruction associated with the activated key. For example, the keys may be used to send an emergency message to a police department, or a fire department (e.g., by dialing number 911).

The audio input/output module 13 carries out a process for outputting a voice signal output from the speaker 20 and receiving a voice signal input in the microphone 21. The audio input/output module 13 amplifies the voice input from the microphone 21, and carries out an analogue/digital conversion to obtain a digital voice input. The audio input/output module 13 applies signal processing such as an encoding or the like to the digital voice input to obtain an encoded digital voice input, and sends the encoded digital voice input to the control module 17. The audio input/output module 13 is also operable to apply signal processing to a digital voice data supplied from the control module 17. The audio input/output module 13 performs decoding, digital/analogue conversion, and amplification, of the digital voice data to convert it into an analogue voice signal for output to the speaker 20. The audio input/output module 13 serves as an informing module for informing a user of an incoming annunciation information message by means of an alarm sound, a voice message, or the like.

The display module 14 can be constructed by using a display device, for example, a liquid crystal display panel, an electro-luminescence (EL) panel, Organic Light Emitted Diode (OLED), or the like, and displays an area corresponding to an image signal supplied from the control module 17. The display module 14 displays various information and images, for example, a telephone number of a received call at the time the is call received, the telephone number of a called number, a call waiting telephone number, contents of a received email, contents of an outgoing email, date, time, battery remaining amount, success and failure of calls, a standby screen, and the like.

The imaging module 15 comprises a camera and may comprise a photoelectric transducer such as a CCD (Charge Coupled Device) and a CMOS (Complementary Metal Oxide Semiconductor) image sensor, a control circuit thereof, and the like.

The storage module 16 stores various data utilized for the processing in the control module 17. The storage module 16 stores, for example, an application program executed by the control module 17, an address book managing a personal information such as a telephone number, an electronic mail address or the like of a communication partner, a voice file for reproducing a call incoming sound and an alarm sound, an image file for the standby screen, various setup data, a temporary data utilized in a process of the program and the like. The storage module 16 stores a threshold change flag 161 and a position registration control flag 162 assigned to a predetermined region as described in more detail below. The storage module 16, which may be realized as RAM memory, flash memory, ROM memory, EPROM memory, EEPROM memory, registers, a hard disk, a removable disk, a CD-ROM, or any other form of storage medium known in the art. In this regard, storage module 16 may be coupled to the control module 17 such that the control module 17 can read information from and write information to storage module 16. As an example, the control module 17 and storage module 16 may reside in their respective ASICs. The storage module 16 may also be integrated into the control module 17. In an embodiment, the storage module 16 may include a cache memory for storing temporary variables or other intermediate information during execution of instructions to be executed by the control module 17. Storage module 16 may also include non-volatile memory for storing instructions to be executed by the control module 17.

The control module 17 is configured to suitably control operations of the portable telephone, and executes various controls in correspondence to the degree of the disaster. In other words, the control module 17 controls operation of each of the blocks mentioned above in connection with FIGS. 1-2. For example, the control module 17 may control sending and receiving of signals in the communication module 11, input and output of the voice in the audio input/output module 13, display of the image in the display module 14 and the like. In this manner, the various processes of the system 300 (wireless device 104) can be executed in accordance with a suitable procedure in correspondence to the operation of the operating module 12. The various processes of the system 300 may comprise a voice phone call carried out via a line switching network, preparation of the electronic mail and send and receive thereof, access to an internet world wide web (Web) site and the like.

The control module 17 is provided with a computer (a microprocessor) executing the process on the basis of the program (an operating system, an application program or the like) stored in the storage module 16, and executes the process mentioned above in accordance with the procedure instructed in the program. In other words, it executes the process by sequentially reading a command cord from the program such as the operating system, the application program or the like stored in the storage module 16. For example, when the annunciation information is received from the base station 102/108, the control module 17 changes a threshold value setting of a hand-off process and the reselection process in the computer with one or a plurality of programs. The control module 17 may include a position registration control timer module 170, a hand-off module 172, and a reselection module 174.

The position registration control timer module 170 is configured to schedule position registration timing for the wireless device 104. The control module 17 activates the position registration control timer module 170 and registers a position of the wireless device 104 in response to detecting time-out of the position registration control timer 170. The position registration control timer 170 allows the wireless device 104 to delay position registration to allow time for receiving annunciation information.

The hand-off module 172 is configured to monitor the signal intensity from the first base station 102 (standby base station) with a position registered and a wait status in the communication module 11, and causes the communication module 11 to perform the hand-off (e.g., to second base station 108) based on a comparison result of the relevant signal intensity and a first threshold value set in advance. In this manner, when the signal intensity from a second base station 108 (hand-off candidate base station) is greater than the signal intensity from the first base station 102 (hand-off original base station) in a wait status, and the difference thereof exceeds a first threshold value, the hand-off module 172 hands-off the standby base station from the hand-off original first base station 102 to the hand-off candidate second base station 108.

The reselection module 174 is configure to monitor the signal intensity from the first base station 102 in standby in the communication system 100 selected by the communication module 11. The reselection module 174 is further configured to release the connection with the second base station 108 selected by the communication module 11 based on a comparison result of the relevant signal intensity and a second threshold value set in advance. After releasing the connection, the standby base station is reselected using one of the communication systems. The reselection process refers to a reselection process of the first base station 102 and the communication system 100 such that after the standby at the selected communication system (not shown) of the second base station 108 is released, another communication system is reselected by the communication module 11 according to the priority defined in advance. The communication module 11 searches for a base station with a satisfactory communication status in the reselected communication system (such as communication system 100). If a base station with satisfactory communication status is found, the position of wireless device 104 is registered in the base station and its communication system. If a base station with a satisfactory communication status is not found, a further search may be made for another base station with satisfactory communication status.

The control module 17 changes the second threshold value in response to receiving the annunciation information. Furthermore, when receiving the annunciation information, the control module 17 sets the information for limiting the position registration before performing the position registration on a trial basis. In this manner, the control module 17 activates the position registration control timer 170 (built-in timer) and performs position registration in response to the detection of time-out of the position registration control timer 170 as a trigger. For example, the control module 17 detects the time-out of the position registration control timer 170 having different timing for every terminal, and performs position registration.

The control module 17 may also determine whether the annunciation information contains emergency information. The control module 17 may change the first threshold value if the annunciation information contains the emergency information in order to raise or lower the likelihood of a base station hand-off. The control module 17 may suspend position registration of the wireless device for a time period if the annunciation information contains the emergency information. The control module may reset the first threshold value to the original hand-off threshold value if the annunciation information is no longer received.

Figure 4:
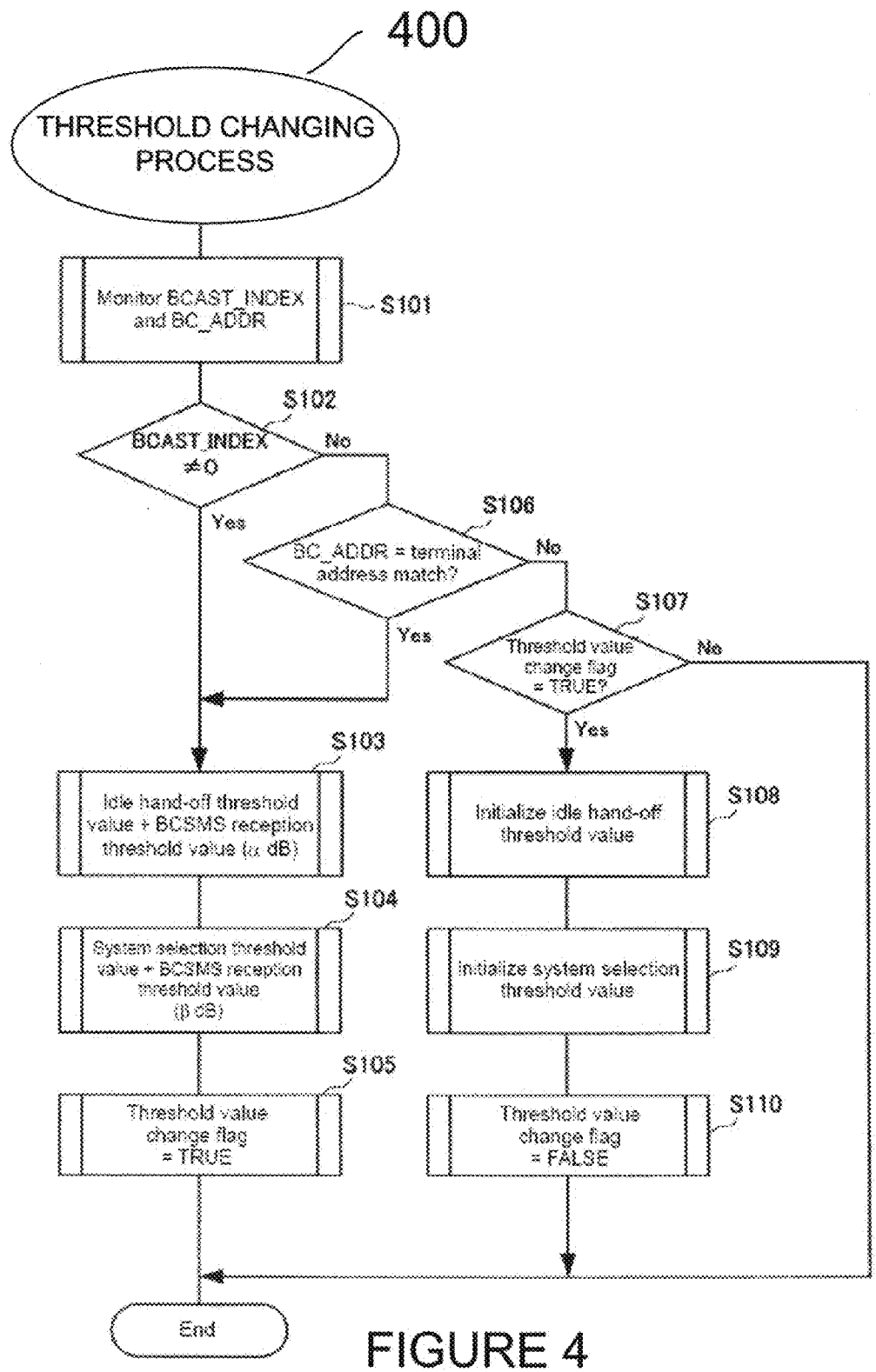
FIG. 4 is a flowchart showing an exemplary threshold changing process for a wireless device according to an embodiment of the disclosure.
Figure 5:
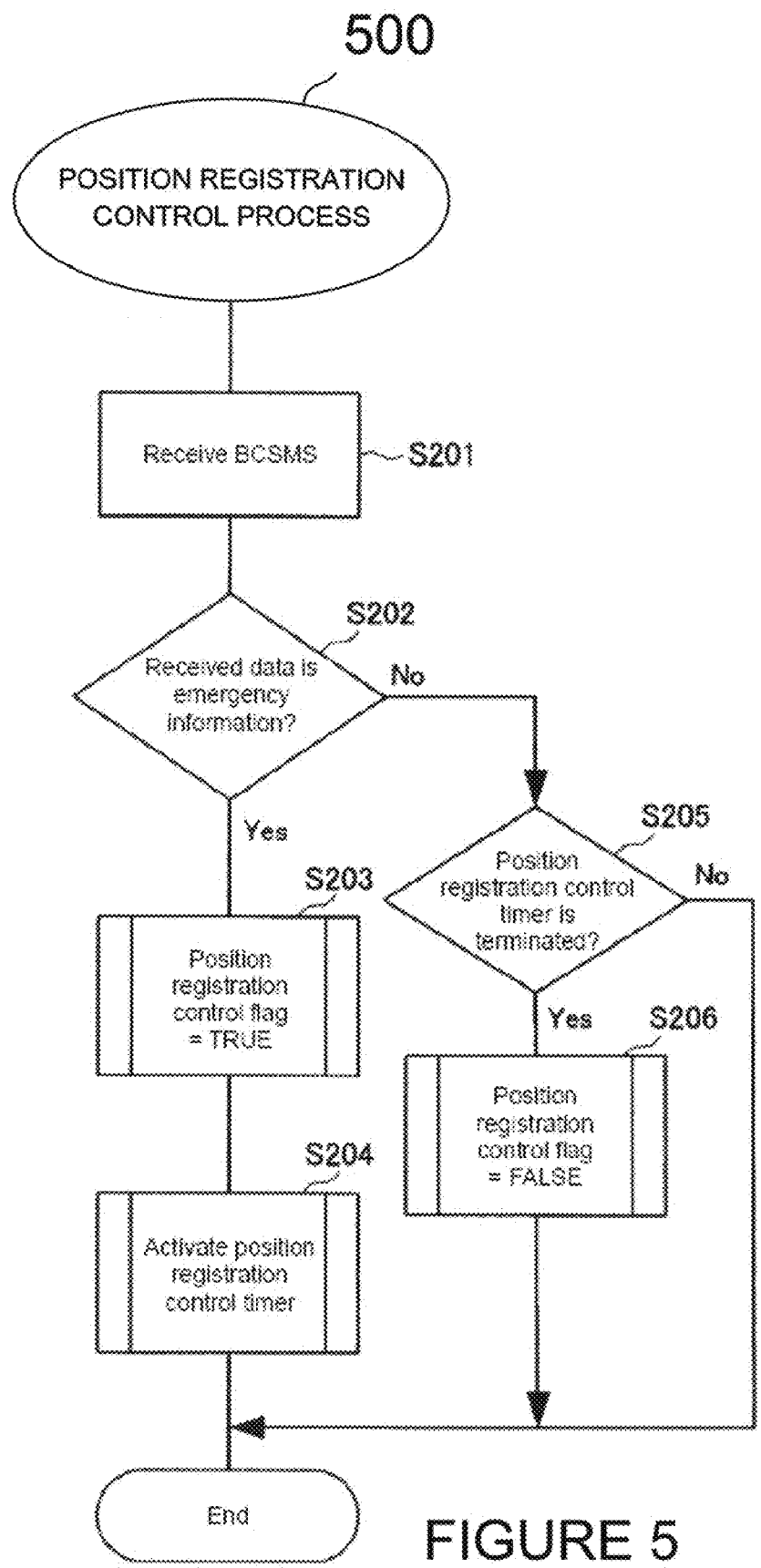
FIG. 5 is a flowchart showing an exemplary position registration control process for a wireless device according to an embodiment of the disclosure.
Figure 6:
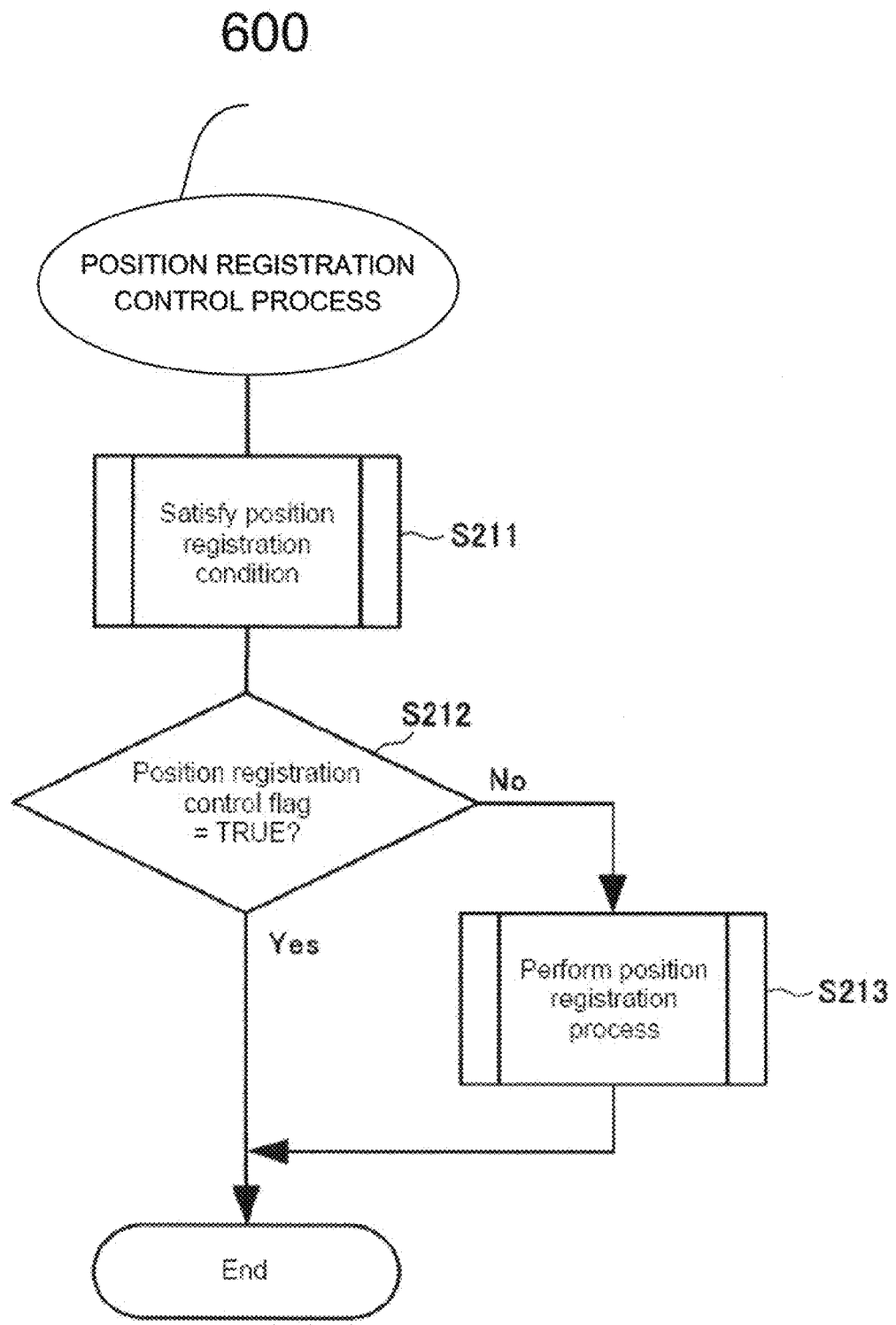
FIG. 6 is a flowchart showing an exemplary position registration process for a wireless device according to an embodiment of the disclosure.

FIGS. 4-6 are flowcharts showing exemplary processes 400-600 for operation of the wireless device 104 according to various embodiments of the present disclosure. The various tasks performed in connection with these processes may be performed by software, hardware, firmware, a computer-readable medium having computer executable instructions for performing the process method, or any combination thereof. It should be appreciated that processes 400-600 may include any number of additional or alternative tasks. The tasks shown in FIGS. 4-6 need not be performed in the illustrated order, and these processes may be incorporated into a more comprehensive procedure or process having additional functionality not described in detail herein. For illustrative purposes, the following description of processes 400-600 may refer to elements mentioned above in connection with FIGS. 1-3. In various embodiments, portions of process 400-600 may be performed by different elements of system 300, e.g., a communication module 11, an operation module 12, an audio input/output module 13, a display module 14, an imaging module 15, a storage module 16, and a control module 17. Processes 400-600 may share the same definitions and functionalities; therefore these definitions and the functionalities may not be redundantly explained herein.

In one practical embodiment, the short message is distributed in the BC slot that is different from the standby slot. Thus, the first base station 102 notifies the wireless device 104 that the short message is transmitted in the BC slot by setting a value of the broadcast index (BCAST_INDEX), which is the parameter of the annunciation information message to other than zero (one to seven) in the standby slot before distributing the short message in the BC slot. The wireless device 104 can check a timing at which the short message may be annunciated by checking the broadcast index (BCAST_INDEX) and check that the short message is distributed by checking the broadcast address (BC_ADDR) of the annunciation information message as explained below in more detail.

FIG. 4 is a flowchart showing an exemplary threshold changing process 400 for the wireless device 104 according to an embodiment of the disclosure. Process 400 may begin with the control module 17 monitoring the BC slot (FIGS. 2A-2D) at the timing specified in the broadcast index (BCAST_IN- DEX) of the annunciation information message from the first base station 102, and monitors the broadcast address (BC_ADDR) (task S101).

If the value of the broadcast index (BCAST_INDEX) is other than "0" ("Yes" branch of inquiry task S102), the control module 17 adds a BCSMS reception threshold value (α dB) to the idle hand-off threshold value (the reception level threshold value at which to start the hand-off) for changing the standby base station (hand-off original base station or first base station 102), and temporarily changes the threshold value to the level at which the idle hand-off may be difficult to start (task S103) as explained below in more detail. The control module 17 continually monitors the signal intensity at the wireless device 104 received from the first base station 102 with which the communication module 11 is in a wait state. The control module 17 also monitors the signal intensity at the wireless device 104 from other base stations (e.g., second base station 108), and performs a hand-off by comparing wireless signal intensities received from the base stations at the wireless device 104. In the present embodiment, the idle hand-off has been described by way of example, but the principle may be used in practical applications of a wireless device 104. The control module 17 controls the communication module 11 to perform the hand-off process when the signal intensity of the hand-off candidate base station (e.g., second base station 108) is greater than that of the standby base station and the difference thereof exceeds a threshold value (first threshold value, or original hand-off threshold value) of the hand-off determination. In other words, the control module 17 provides an environment in which the hand-off is more difficult by adding the BCSMS reception threshold value (α dB). In this manner, the control module 17 increases the first threshold value of the hand-off determination by α dB. Therefore, changing the threshold value of the hand-off makes the hand-off less likely to occur (i.e., SMS messages are being received so there is less need to hand-off).

The control module 17 then adds the BCSMS reception threshold value (β dB) to the communication system reselection threshold value (an original communication system reselection threshold value at which to start the communication system selection). The control module 17 then temporarily changes the system selection threshold value to a level at which the communication system selecting operation by the reselection module 174 may be difficult to start (task S104). Similar to the case of the hand-off, the control module 17 continually monitors the signal intensity at the wireless device 104 received at the communication module 11 from the standby base station in a wait state. The control module 17 controls the communication module 11 to perform the reselection process when the signal intensity is lower than the threshold value (second threshold value) of reselection implementation determination and determined that the communication system 100 is to be reselected. In other words, the control module 17 provides an environment in which reselection is more difficult by adding the BCSMS reception threshold value (β dB). In this manner, the control module 17 decreases the second threshold value of the reselection determination by β dB. Therefore, the communication system reselection becomes more difficult by changing the communication system reselection threshold value. In this manner, the control module 17 reduces the communication system reselection threshold value so that reselection of the communication system is more difficult when receiving the annunciation information.

Process 400 may then continues with the control module 17 setting the threshold value change flag 161 to ON (TRUE) (task S105) which is stored in a predetermined region of the storage module 16. In this manner, the control module 17 indicates to the system 300 that the original idle hand-off threshold value for idle hand-off and the communication system reselection threshold value are changed. In the above example, the short message received by the annunciation information message contains the emergency information. But, if the short message specified in the annunciation information message does not contain the emergency information, the threshold values for the idle hand-off and the communication system reselection are desirably unchanged even when the annunciation information message is received. Thus, when the annunciation information message is received, it is determined whether or not the annunciation information message is emergency information. If the emergency information is acquired, process 400 continues by changing the threshold values (task S103 and task S104). If the emergency information is not acquired, process 400 skips task S103 and task S104.

If the parameter value of the broadcast index (BCAST_INDEX) is "0", or if the short message distribution is terminated, i.e., the annunciation information is no longer received ("No" branch of inquiry task S102), the control module 17 determines whether or not the broadcast address (BC_ADDR) matches the broadcast address (BC_ADDR) of the wireless device 104 (task S106).

If the BC_ADDR addresses do not match ("No" branch of inquiry task S106), the control module 17 further determines the state of the threshold value change flag 161 (inquiry task S107). If the threshold value change flag 161 is ON (TRUE) ("Yes" branch of inquiry task), the original hand-off threshold value for idle hand-off is initialized to be reset to the original hand-off threshold value (task S108), and the communication system reselection threshold value is initialized to reset to the original communication system reselection threshold value (task S109). Thereafter, the control module 17 sets the threshold value change flag 161 to OFF (FALSE) (task S110), and process 400 ends.

If the BC_ADDR addresses match ("Yes" branch of task S106), process 400 proceeds to task S103, and if the threshold value change flag 161 is set to OFF ("No" branch of inquiry task S107), process 400 ends.

According to an embodiment of the disclosure, the idle hand-off threshold value and the communication system reselection threshold value can be changed automatically to make the wireless device 104 robust against communication system congestion during an emergency. In this manner, the short message can be received in the communication system when information is distributed by the BCSMS even when reception is often blocked by congestion caused by movement of concentrated groups of users.

As mentioned above, the timing at which the short message will be annunciated can be known in advance via the value of the broadcast index (BCAST_INDEX). Therefore, the BC slot can be monitored without interruption. In this manner, reselection of the communication system or transition to an out-of-service mode, when the short message is annunciated should not occur, and thus reception of short messages is not suppressed.

User convenience is improved since the operations are performed without requiring user action. In other words, the wireless device 104 can receive information during standby and access is not made to the first base station 102 while receiving information using the BCSMS. Thus, the amount of resources consumed by the wireless device 104 for receiving information can be kept to a minimum (i.e., resource consumption may be similar to being substantially in standby).

Also, resources for communication are not occupied. Thus, problems such as system congestion do not arise.

The standby base station can be changed due to the movement of the user as described below in the context of discussion of FIGS. 5 and 6.

For example, when the standby base station is changed due to the movement of the user receiving the emergency information and the like notified in BCSMS, the relevant movement may occur when position registration zones (zone to which the position of the relevant terminal is registered) to which the hand-off original base station (e.g., first base station 102) and the hand-off destination base station (e.g., second base station 108) belong are different. The position registration zone is configured by a base station group to have a certain number of base stations, and is a concept in building the network used to successfully call out a terminal such as the wireless device 104 at an early stage. The call-out is made at once for all the base stations in the position registration zone when calling out a specific terminal from the network side. Therefore, if the base station moves to a position registration zone that is different from the position registration zone for the incoming call control and the like, the position registration zone needs to be changed. In other words, the position registration operation (Zone Based Registration) needs to be executed by the standard when the position registration zone is changed, whereby access is made to the first base station 102.

FIG. 5 is a flowchart showing an exemplary position registration control process 500 for a wireless device 104 according to an embodiment of the disclosure. Process 500 may begin by the control module 17 monitoring the BC slot at the timing specified in the broadcast index (BCAST_INDEX) of the annunciation information message from the first base station 102, and receives the short message (task S201).

If it is determined that the content of the received short message is emergency information ("Yes" branch of inquiry task S202), the control module 17 sets the position registration control flag 162 (assigned and set to a predetermined region of the storage module 16) to ON (TRUE) (task S203), and activates the position registration control timer 170 built therein (task S204), and process 500 ends.

When receiving the emergency information even if the position registration zone is changed, the control module 17 does not perform the Zone Based Registration, and activates the position registration control timer 170 in which a count value is defined by a random number. The time-out timing can also be set uniquely for every terminal. For example, the timer counting from 0 to 9 may be used using the last one bit of the terminal ID unique to the terminal. The position registration control timer 170 has a different initial value that is set depending on the terminal.

If it is determined that the content of the received short message is not emergency information ("No" branch of inquiry task S202), the control module 17 determines whether or not the position registration control timer 170 is terminated (time out) (inquiry task S205). If the position registration control timer is terminated ("Yes" branch of inquiry task S205), the control module 17 sets the position registration control flag 162 to OFF (FALSE) (task S206), and process 500 ends.

The control module 17 sets the information for setting the position registration control flag 162 to ON (TRUE) before the position information registration to suppress the position registration (task S203) and activates the position registration control timer 170 (task S204) to control the traffic upon concentration of accesses when receiving the emergency information. When detecting time-out of the position registration control timer 170, the control module 17 sets the position registration control flag to OFF and performs the position registration process.

FIG. 6 is a flowchart showing an exemplary position registration process 600 for a wireless device 104 according to an embodiment of the disclosure. Process 600 may begin with the control module 17 determining if the position registration control flag 162 is TRUE when the position registration condition is satisfied (task S211), specifically, when the position registration control timer 170 is time-out. The position registration process is executed (task S213) if the position registration control flag 162 is FALSE ("No" branch of task S212). The position registration control timer 170 can be set as explained above in the context of discussion of process 500.

Therefore, according to the present embodiment, even if the emergency information is annunciated by the BCSMS to unspecified number of people in a certain region and a large number of users move to the same zone at once, the event in which access is made at once from the large number of wireless devices 106 such as the wireless device 104 to the network side device including the first base station 102 can be avoided. In this manner congestion of the communication system in time of an emergency can be avoided. As a result, a communication line can be ensured in time of an emergency, whereby increasing a probability of rate of a successful call initiation during a disaster. Therefore convenience and safety of the user is improved.

While at least one exemplary embodiment has been presented in the foregoing detailed description, the present disclosure is not limited to the above-described embodiment or embodiments. Variations may be apparent to those skilled in the art. In carrying out the present disclosure, various modifications, combinations, sub-combinations and alterations may occur in regard to the elements of the above-described embodiment insofar as they are within the technical scope of the present disclosure or the equivalents thereof. The exemplary embodiment or exemplary embodiments are examples, and are not intended to limit the scope, applicability, or configuration of the disclosure in any way. Rather, the foregoing detailed description will provide those skilled in the art with a template for implementing the exemplary embodiment or exemplary embodiments. It should be understood that various changes can be made in the function and arrangement of elements without departing from the scope of the disclosure as set forth in the appended claims and the legal equivalents thereof. Furthermore, although embodiments of the present disclosure have been described with reference to the accompanying drawings, it is to be noted that changes and modifications may be apparent to those skilled in the art. Such changes and modifications are to be understood as being included within the scope of the present disclosure as defined by the claims.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

In this document, the terms "computer program product", "computer-readable medium", and the like, may be used generally to refer to media such as, memory storage devices, or storage module. These, and other forms of computer-readable media, may be involved in storing one or more instructions for use by processor to cause the processor to perform specified operations. Such instructions, generally referred to as "computer program code" (which may be grouped in the form of computer programs or other groupings), when executed, enable the computing system.

It will be appreciated that, for clarity purposes, the above description has described embodiments of the invention with reference to different functional modules and processors. However, it will be apparent that any suitable distribution of functionality between different functional modules, processors or domains may be used without detracting from the invention. For example, functionality illustrated to be performed by separate processors or controllers may be performed by the same processor or controller. Hence, references to specific functional modules are only to be seen as references to suitable means for providing the described functionality, rather than indicative of a strict logical or physical structure or organization.

Additionally, memory or other storage, as well as communication components, may be employed in embodiments of the invention. It will be appreciated that, for clarity purposes, the above description has described embodiments of the invention with reference to different functional modules and processors. However, it will be apparent that any suitable distribution of functionality between different functional modules, processing logic elements or domains may be used without detracting from the invention. For example, functionality illustrated to be performed by separate processing logic elements, or controllers, may be performed by the same processing logic element, or controller. Hence, references to specific functional modules are only to be seen as references to suitable means for providing the described functionality, rather than indicative of a strict logical or physical structure or organization.

Furthermore, although individually listed, a plurality of means, elements or method steps may be implemented by, for example, a single module or processing logic element. Additionally, although individual features may be included in different claims, these may possibly be advantageously combined. The inclusion in different claims does not imply that a combination of features is not feasible and/or advantageous. Also, the inclusion of a feature in one category of claims does not imply a limitation to this category, but rather the feature may be equally applicable to other claim categories, as appropriate.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed is:

1. A wireless device comprising:
a communication module located within a housing of the wireless device and operable to communicate with a plurality of base stations; and
a control module located within the housing and electrically coupled to the communication module, the control module comprising a hand-off module, wherein the hand-off module is operable to change a standby base station from a first base station in a wait state to a second base station based on a comparison between a first signal intensity from the first base station and a first threshold value,
wherein the control module is further operable to change the first threshold value in response to receiving annunciation information that announces transmission of a broadcast message before the broadcast message is transmitted from the first base station.

2. The wireless device according to claim 1, wherein the control module is further operable to determine if the annunciation information comprises emergency information, and change the first threshold value if the annunciation information comprises the emergency information.

3. The wireless device according to claim 1, wherein the control module is further operable to increase the first threshold value from an original hand-off threshold value in response to receiving the annunciation information.

4. The wireless device according to claim 3, wherein the control module is further operable to reset the first threshold value to the original hand-off threshold value if the annunciation information is no longer received.

5. The wireless device according to claim 1, wherein the annunciation information is broadcast information.

6. The wireless device according to claim 5, wherein the broadcast information is received in a broadcast slot located in a reception time slot of a paging channel.

7. The wireless device according to claim 5, wherein the broadcast information is received in a standby slot of a paging channel.

8. The wireless device according to claim 1, wherein the control module is further operable to suspend registration of a position of the wireless device for a time period in response to receiving the annunciation.

9. The wireless device according to claim 8, wherein the time period is determined by a unique identifier of the wireless device.

10. The wireless device according to claim 8, wherein the control module is further operable to determine if the annunciation information comprises emergency information and to suspend registration of the position of the wireless device for the time period if the annunciation information comprises the emergency information.

11. The wireless device according to claim 1, wherein
the communication module is further operable to communicate wirelessly via a plurality of communication systems, and wherein
the control module further comprises a reselection module operable to reselect one of the communication systems based on a comparison between the first signal intensity from the first base station and a second threshold value, and wherein the control module changes the second threshold value in response to receiving the annunciation information from the first base station.

12. The wireless device according to claim 11, wherein the control module is further operable to determine if the annunciation information comprises emergency information and to change the second threshold value if the annunciation information comprises the emergency information.

13. The wireless device according to claim 11, wherein the reselection module is further operable to reselect one of the communication systems if the first signal intensity is less than the second threshold value.

14. The wireless device according to claim 11, wherein the control module is further operable to reduce the second threshold value.

15. A wireless device comprising:
a communication module located within a housing of the wireless device and operable to communicate wirelessly with a base station via a plurality of communication systems; and
a control module located within the housing and electrically coupled to the communication module, the control module comprising a reselection module operable to reselect one of the communication systems based on a comparison between the first signal intensity from the base station and a second threshold value,
wherein the control module changes the second threshold value in response to receiving an annunciation information that announces transmission of a broadcast message before the broadcast message is transmitted from the base station.

16. A method for communication in a wireless device, the method comprising:
communicating with a standby base station;
comparing a first signal intensity from a first base station in a wait state to a first threshold value to obtain a first comparison result;
changing, by a processor, the standby base station from the first base station to a second base station based on the first comparison result;
receiving annunciation information that announces transmission of a broadcast message before the broadcast message is transmitted from the first base station; and
changing the first threshold value based on the annunciation information.

17. The method according to claim 16, further comprising:
comparing the first signal intensity from the first base station to a second threshold value to obtain a second comparison result;
reselecting a communication system based on the second comparison result;
receiving annunciation information from the first base station; and
changing the second threshold value based on the annunciation information.

18. A non-transitory computer readable medium for a wireless device, the computer readable medium comprising program code for:
communicating with a standby base station;
comparing a first signal intensity from a first base station in a wait state to a first threshold value to obtain a comparison result;
changing a standby base station from the first base station to a second base station based on the comparison result;
receiving annunciation information that announces transmission of a broadcast message before the broadcast message is transmitted from the first base station; and
changing the first threshold value based on the annunciation information.

19. The non-transitory computer readable medium according to claim 18, further comprising program code for:
comparing the first signal intensity from the first base station to a second threshold value to obtain a second comparison result;
reselecting a communication system based on the second comparison result;
receiving annunciation information from the first base station; and
changing the second threshold value based on the annunciation information.

20. A wireless device, comprising:
a communication module located within a housing of the wireless device and operable to communicate with a plurality of base stations; and
a control module located within the housing and electrically coupled to the communication module, the control module comprising a hand-off module, wherein the hand-off module is operable to change a standby base station from a first base station in a wait state to a second base station based on a comparison between a first signal intensity from the first base station and a first threshold value, wherein
the control module is further operable to change the first threshold value in response to receiving annunciation information that announces transmission of a broadcast message before the broadcast message is transmitted from the first base station,
the control module is further operable to increase the first threshold value from an original hand-off threshold value in response to receiving the annunciation information, and
the control module is further operable to reset the first threshold value to the original hand-off threshold value if the annunciation information is no longer received.

21. A wireless device, comprising:
a communication module located within a housing of the wireless device and operable to communicate with a plurality of base stations; and
a control module located within the housing and electrically coupled to the communication module, the control module operable to cause the communication unit to perform a handoff, wherein the control module is further operable to restrict the handoff, if the communication module receives annunciation information that announces transmission of a broadcast message before the broadcast message is transmitted from a standby base station.

22. The wireless device according to claim 21, wherein the annunciation information comprises emergency information.

* * * * *